United States Patent
Chen et al.

(10) Patent No.: US 7,301,719 B1
(45) Date of Patent: Nov. 27, 2007

(54) CLEARANCE SWEEP TEST

(75) Inventors: Chao Yuan Chen, San Jose, CA (US); Shuyu Sun, Saratoga, CA (US); Hoa Pham, San Jose, CA (US); Sang Lee, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/525,292

(22) Filed: Sep. 21, 2006

(51) Int. Cl.
*G11B 15/18* (2006.01)

(52) U.S. Cl. ...................................... 360/69
(58) Field of Classification Search ............... 360/69, 360/75, 71, 59, 135; 428/833.5; 73/105
See application file for complete search history.

(56) References Cited

U.S. PATENT DOCUMENTS

| | | | |
|---|---|---|---|
| 6,417,981 B1 * | 7/2002 | Smith ........................... | 360/75 |
| 6,773,784 B2 * | 8/2004 | Sonoda et al. ........... | 428/833.5 |
| 6,914,739 B2 * | 7/2005 | Feliss et al. .................. | 360/69 |
| 7,124,625 B1 * | 10/2006 | Kurita et al. ................. | 73/105 |

* cited by examiner

*Primary Examiner*—Fred F. Tzeng
(74) *Attorney, Agent, or Firm*—Ben J. Yorks; Irell & Manella LLP

(57) ABSTRACT

A calibration method for a fly on demand head of a hard disk drive. The method includes the steps of flying a head over a test track of a disk that is covered with a lubricant. A voltage is applied to a heating element of the head to move the head closer to the disk. The fly height of the head is then determined. The voltage can be incrementally varied until the head makes contact with the disk. This sequence can cause a modulated wear pattern in the lubricant of the disk. The voltage is terminated and the head is allowed to fly over the test track. The head is also moved to adjacent tracks on either side of the test track. A pressure gradient of the flying head moves the lubricant about the disk to mitigate the modulated wear pattern.

18 Claims, 4 Drawing Sheets

CLEARANCE SWEEP TEST

BACKGROUND OF THE INVENTION

1. Field of the Invention

The present invention relates to hard disk drives and a method for minimizing wear patterns created by contact between a head and a disk of the drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the fly height of the head.

The magnetic field detected by the head is inversely proportional to the fly height of the head. Likewise, the strength of the magnetic field written onto the disk is also inversely proportional to the fly height. A larger fly height will produce a weaker magnetic field on the disk.

There have been developed heads that contain a heater coil. Current is provided to the heater coil to generate heat and thermally expand the head to move the read and write elements closer to the disk. Heads with heater coils are sometimes referred to as fly on demand ("FOD") heads. The fly height of FOD heads can be varied by changing the voltage applied to the heater coil.

To optimize the performance of a disk drive a calibration technique is typically employed to determine the correct voltage(s) that is to be applied to the heating elements of the heads. The calibration technique includes incrementing the heating element voltage until the head makes contact with the disk.

The disks are typically covered with an outer layer of lubricant to reduce friction between the heads and the disks. During the calibration technique the head may drag along the disk and create undesirable wear of the lubricant. FIG. 1 shows a disk track with a series of modulated wear patterns 1 caused by a calibration technique. The frequency of modulation typically corresponds to the first slider pitch mode of the head. For example, the wear pattern may have a frequency of 200,000 hertz. The modulated wear pattern can degrade head-disk interface reliability.

BRIEF SUMMARY OF THE INVENTION

A method for calibrating a fly on demand head of a hard disk drive. The method includes flying a head relative to a test track of a disk. A voltage is applied to a heating element of the head and the head fly height is determined. The touchdown voltage is terminated and the head is allowed to fly over the test track. The head is also moved to adjacent tracks to move a lubricant on the disk surface.

DETAILED DESCRIPTION

Disclosed is a calibration method for a fly on demand head of a hard disk drive. The method includes the steps of flying a head over a test track of a disk that is covered with a lubricant. A voltage is applied to a heating element of the head to move the head closer to the disk. The fly height of the head is then determined. The voltage can be incrementally varied until the head makes contact with the disk. This sequence can cause a modulated wear pattern in the lubricant of the disk. The voltage is terminated and the head is allowed to fly over the test track. The head is also moved to adjacent tracks on either side of the test track. A pressure gradient of the flying head moves the lubricant about the disk to mitigate the modulated wear pattern.

Figure 2:
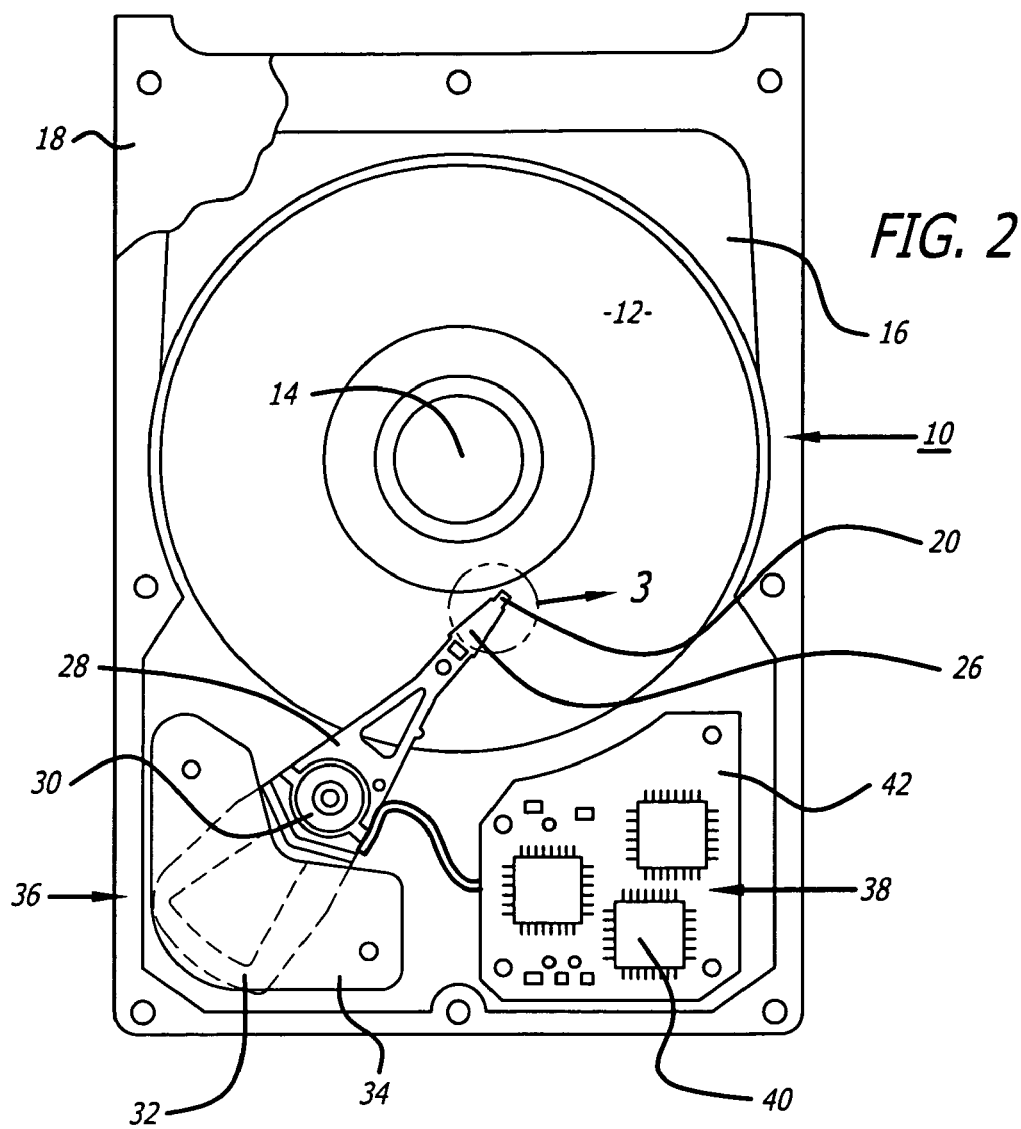
FIG. 2 is a top view of an embodiment of a hard disk drive.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12. The disks 12 are typically covered with an outer layer of lubricant.

Figure 3:
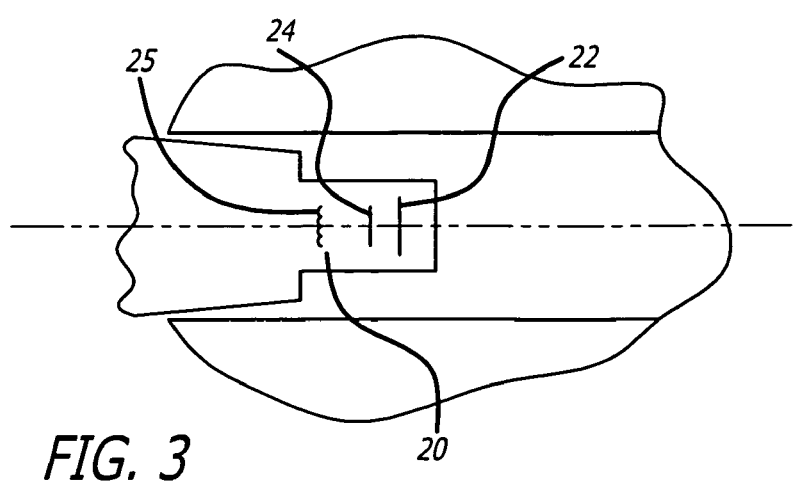
FIG. 3 is a top enlarged view of a head of the hard disk drive.

The disk drive 10 may include a plurality of heads 20 located adjacent to the disks 12. As shown in FIG. 3 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. Each head 20 also contains a heater coil 25. Current can be provided to the heater coil 25 to generate heat within the head 20. The heat thermally expands the head 20 and moves the read 24 and write 22 elements closer to the disk.

Referring to FIG. 2, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 4:
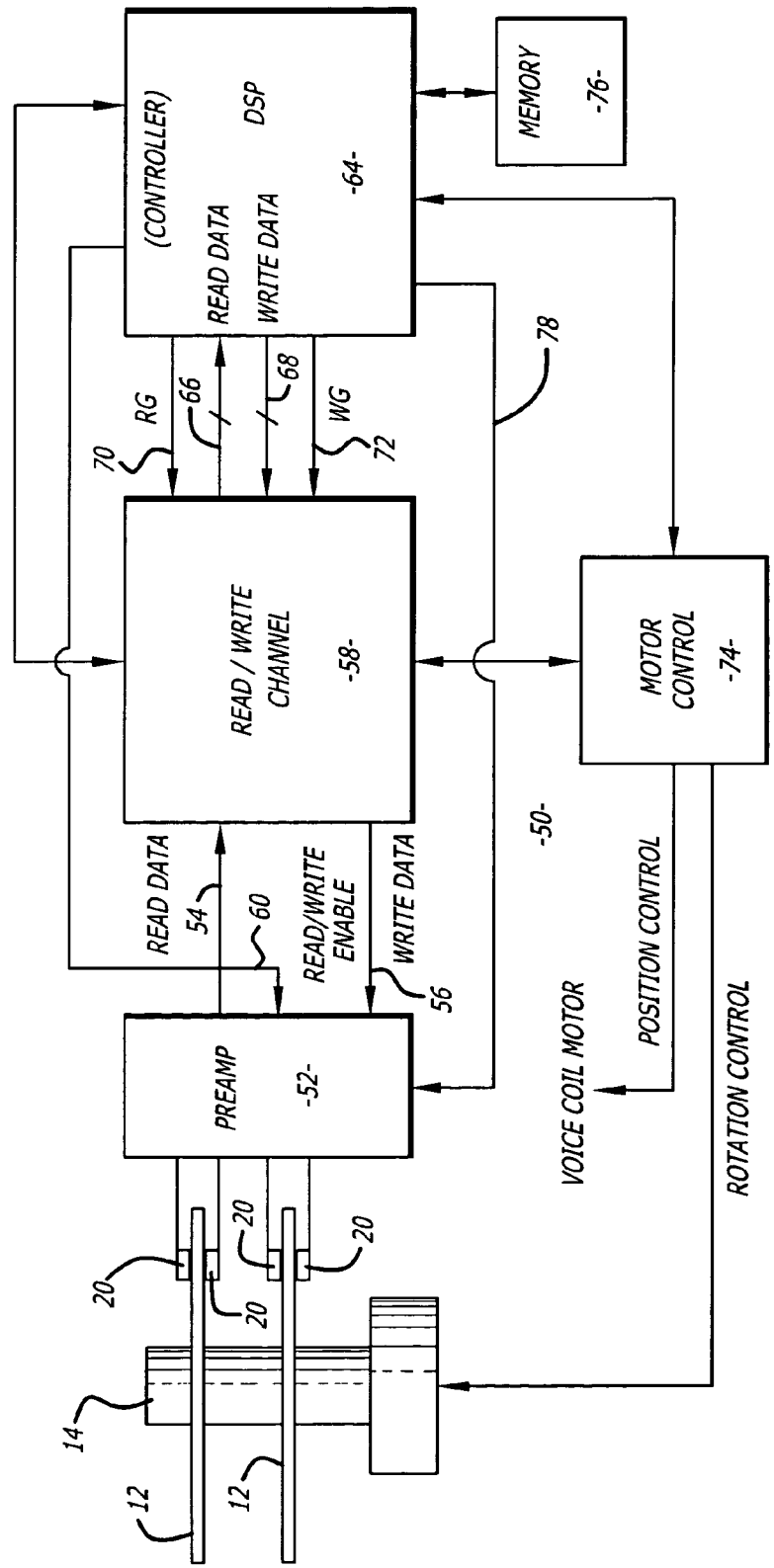
FIG. 4 is a schematic of the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

The controller 64 may be connected to the heater coil 25 of each head by line(s) 78 and the preamplifier circuit 52. The controller 64 can provide a current to the heater coil 25 to control the flying height of the head.

Figure 5:
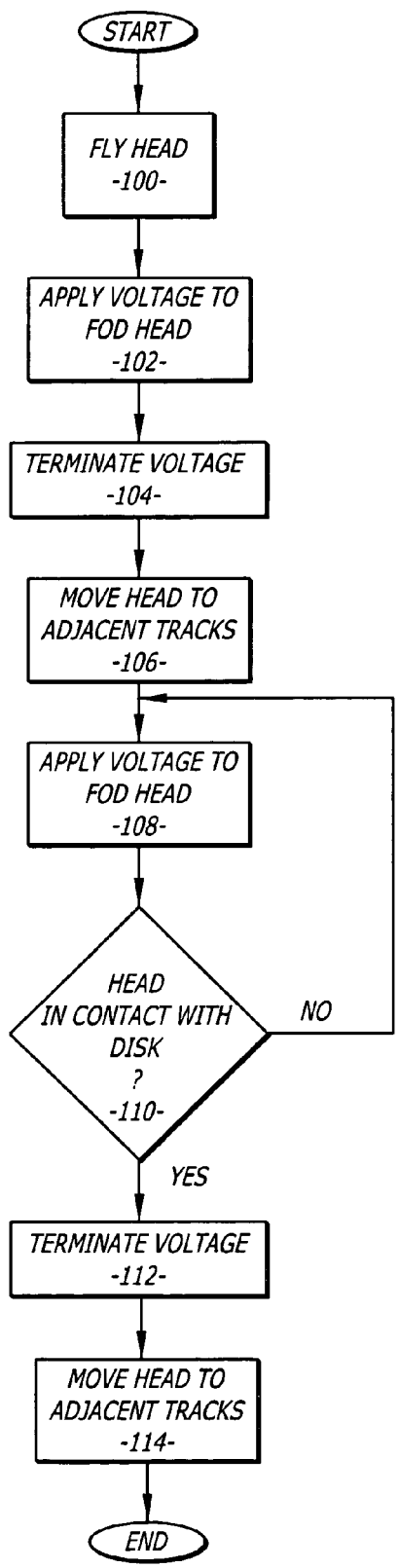
FIG. 5 is a flow chart showing a method for calibrating a fly on demand head.

FIG. 5 shows a calibration method for calibrating a fly on demand head. The calibration method can be performed in accordance with instructions and data operated on by the controller 64. The controller 64 may be connected to an external device which provides the instructions and/or data.

In step 100 the disks of the hard drive are rotated so that the heads fly relative to a test track. A voltage is applied to a heating element of a head in step 102. The voltage creates heat and a corresponding thermal expansion of the head. The thermal expansion moves the write and read elements closer to the disk. A signal can be written onto the disk and then read to determine a fly height of the head.

In step 104 the voltage to the heating element is terminated. The head is allowed to fly over the test track. In step 106 the head is moved to adjacent tracks and allowed to fly without a voltage being applied to the heating element. By way of example, the head may be moved +/−1000 adjacent tracks over a 20 second interval.

In step 108 another voltage is applied to the heating element and the fly height is again measured. It is determined whether the head makes contact with the disk in decision block 110. The voltage may be increased in 0.1 volt increments until the head is in contact with the disk. Between each increase in voltage to the next level, the head heating is off for a short period and the head is flying near the test track to smooth out the lube modulated wear by the whole slider ABS force. Eventually, the touchdown voltage is terminated and the head is allowed to fly over the test track.

Figure 1:
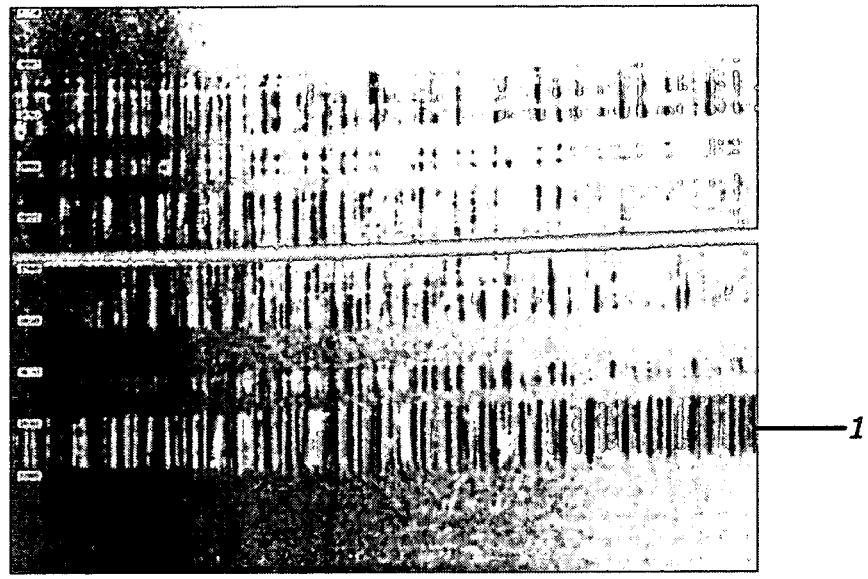
FIG. 1 is an illustration of a top surface of a disk of the prior art showing a modulated wear pattern.
Figure 6:
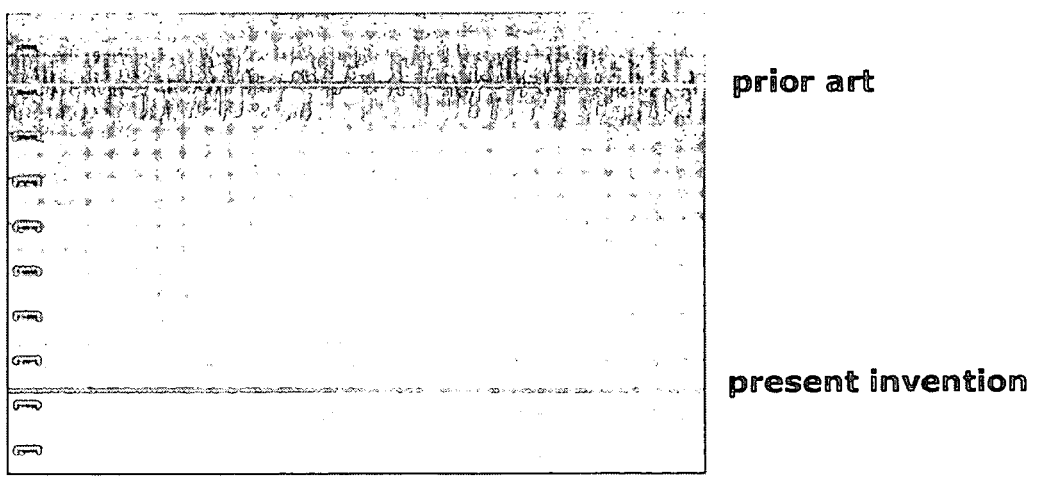
FIG. 6 is an illustration showing a modulated wear pattern of the prior art compared to a modulated wear pattern created with the calibration technique described in FIG. 5.

In step 112 the voltage is again terminated so that the head again flies over the test track. The head is moved to adjacent tracks without application of the heating element voltage in step 114. By way of example, the head may be moved +/−1000 tracks for a time period of 20 seconds. The pressure gradient of the head pushes the lubricant around the disk and mitigates the modulated wear pattern normally found on the disks. Flying the head over the test track demodulates the lubricant wear pattern. Flying the head over the adjacent tracks pushes lubricant into the modulated wear area. FIG. 6 is a photograph of a modulated wear pattern of the prior art compared with a wear pattern mitigated by the calibration technique of the present invention. It can be seen that the disk surface is less disturbed by the FOD head calibration with the technique of the present invention.

The sweep mechanism can be most effective when used at relatively low temperatures when the lube mobility is at relatively lower level. At low temperatures the lubricant may become modulated if head is not moved to adjacent tracks after each increment in voltage and after the final increment. Heating will cause much higher pole-tip protrusion will produces a higher pressure gradient locally and generates higher lube depletion forces to modulate the lubricant corresponding with a slider vibration pitch mode.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, the head may be flown over the test track and the adjacent tracks after each incremental increase in the heating element voltage.

What is claimed is:

1. A method for calibrating a fly on demand head of a hard disk drive, comprising:
   rotating a disk covered with a lubricant relative to a head so that the head flies relative to a test track of the disk;
   applying a first voltage to a heating element of the head to move the head relative to the disk;
   determining a fly height of the head;
   terminating the application of the first voltage to the heating element;
   flying the head over the test track to move the lubricant on the disk; and,
   moving the head to a plurality of adjacent tracks to fly over the adjacent tracks and move the lubricant on the disk.

2. The method of claim 1, wherein the head is moved to a plurality of +/−N number of tracks about the test track.

3. The method of claim 2, wherein the head is moved +/−1000 tracks in a 20 second time interval.

4. The method of claim 1, further comprising applying a second voltage to the heating element and determining a fly height of the head.

5. The method of claim 4, further comprising applying a third voltage to the heating element to move the head into contact with the disk, terminating the application of the third voltage to the heating element and moving the head to a plurality of adjacent tracks to move the lubricant on the disk.

6. The method of claim 5, wherein the first, second and third voltages vary in 0.1 V increments.

7. A hard disk drive, comprising:
   a disk with a lubricant;
   a spindle motor coupled to said disk;
   a head coupled to said disk, said head having a write element, a read element and a heater coil;
   an actuator coupled to said head;
   a voice coil motor coupled to said actuator; and,
   a controller circuit that causes; said disk to rotate relative to a head so that said head flies relative to a test track of said disk, an application of a first voltage to said heating element of said head to move said head relative to said disk, a determination of a fly height of said head, a termination of said application of said first voltage to said heating element so that said head flies over said test track to move said lubricant on said disk, movement of said head to a plurality of adjacent tracks to fly over said adjacent tracks and move said lubricant on said disk.

8. The disk drive of claim 7, wherein said controller circuit causes said head to move to a plurality of +/−N number of tracks about said test track.

9. The disk drive of claim 8, wherein said controller circuit causes said head to move +/−1000 tracks in a 20 second time interval.

10. The disk drive of claim 7, wherein said controller circuit causes an application of a second voltage to said heating element and a determination of a fly height of said head.

11. The disk drive of claim 10, wherein said controller circuit causes; an application of a third voltage to said heating element to move said head into contact with said disk, a termination of said application of the second voltage to said heating element, a movement of said head to a plurality of adjacent tracks to move a lubricant on said disk.

12. The disk drive of claim 11, wherein said first, second and third voltages vary in 0.1 V increments.

13. A hard disk drive, comprising:
a disk with a lubricant;
a spindle motor coupled to said disk;
a head coupled to said disk, said head having a write element, a read element and a heater coil;
an actuator coupled to said head;
a voice coil motor coupled to said actuator; and,
controller means for causing; said disk to rotate relative to a head so that said head flies relative to a test track of said disk, an application of a first voltage to said heating element of said head to move said head relative to said disk, a determination of a fly height of said head, a termination of said application of said first voltage to said heating element so that said head flies over said test track to move said lubricant on said disk, said head to move to a plurality of adjacent tracks to fly over said adjacent tracks and move said lubricant on said disk.

14. The disk drive of claim 13, wherein said controller means causes said head to move to a plurality of +/−N number of tracks about said test track.

15. The disk drive of claim 14, wherein said controller means causes said head to move +/−1000 tracks in a 20 second time interval.

16. The disk drive of claim 13, wherein said controller means causes an application of a second voltage to said heating element and a determination of a fly height of said head.

17. The disk drive of claim 16, wherein said controller means causes an application of a third voltage to said heating element to move said head into contact with said disk, a termination of said application of said second voltage to said heating element, a movement of said head to a plurality of adjacent tracks to move a lubricant on said disk.

18. The disk drive of claim 17, wherein said first, second and third voltages vary in 0.1 V increments.

* * * * *